(12) United States Patent
Nilsson

(10) Patent No.: US 8,428,821 B2
(45) Date of Patent: Apr. 23, 2013

(54) OPERATING METHOD AND SYSTEM FOR SUPPORTING LANE KEEPING OF A VEHICLE

(75) Inventor: Jonas Nilsson, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 320 days.

(21) Appl. No.: 12/670,415

(22) PCT Filed: Aug. 15, 2007

(86) PCT No.: PCT/SE2007/000727
§ 371 (c)(1),
(2), (4) Date: Jan. 25, 2010

(87) PCT Pub. No.: WO2009/022947
PCT Pub. Date: Feb. 19, 2009

(65) Prior Publication Data
US 2010/0191421 A1 Jul. 29, 2010

(51) Int. Cl.
*A01B 69/00* (2006.01)
(52) U.S. Cl.
USPC .......................................................... 701/41
(58) Field of Classification Search ............... 701/41
See application file for complete search history.

(56) References Cited

U.S. PATENT DOCUMENTS

| | | | |
|---|---|---|---|
| 5,765,116 A * | 6/1998 | Wilson-Jones et al. | 701/41 |
| 6,408,236 B2 * | 6/2002 | Nishiwaki et al. | 701/41 |
| 2002/0169531 A1 * | 11/2002 | Kawazoe et al. | 701/41 |
| 2003/0078712 A1 * | 4/2003 | Shimakage et al. | 701/41 |
| 2004/0158377 A1 * | 8/2004 | Matsumoto et al. | 701/48 |
| 2005/0246101 A1 | 11/2005 | Courtenay et al. | |
| 2006/0030987 A1 | 2/2006 | Akita | |
| 2006/0047390 A1 * | 3/2006 | Scherl et al. | 701/41 |

(Continued)

FOREIGN PATENT DOCUMENTS

| CN | 1775601 A | 5/2006 |
|---|---|---|
| DE | 102005028787 A1 | 5/2006 |
| DE | 102005023185 A1 | 11/2006 |

OTHER PUBLICATIONS

Supplementary European Search Report for corresponding European App. EP 07 79 4115.
M. Montiglio et al., entitled "Development of a lane keeping support system for heavy trucks" published in www.prevent-ip.org/download/Events/20061008- 12_ITS_WC_London/TS128/Paper%202180.pdf.

(Continued)

*Primary Examiner* — James Trammell
*Assistant Examiner* — Michael D Lang
(74) *Attorney, Agent, or Firm* — WRB-IP LLP

(57) ABSTRACT

A system and an operating method are provided for supporting lane keeping of a vehicle equipped with a steering device. The system and operating method include providing vehicle related information; providing environment related information; combining vehicle and environment related information; predicting a future trajectory of the vehicle based on vehicle and environment related information; estimating a desired lateral lane position of the vehicle and/or a guiding force; comparing the future trajectory and the desired lateral lane position; deciding if a guiding force is to be provided to the steering device; and, if guiding force is to be provided, defining an amount of said guiding force depending on a hierarchically ordered set describing a predetermined driving behavior of the vehicle, adapting the amount of guiding force depending on the direction in which the vehicle is intended to move and activating one or more actuators for supplying the adapted amount of guiding force to the steering device.

35 Claims, 3 Drawing Sheets

U.S. PATENT DOCUMENTS

| | | | |
|---|---|---|---|
| 2006/0095195 A1 | 5/2006 | Nishimura et al. | |
| 2006/0217860 A1 | 9/2006 | Ihara | |
| 2007/0164852 A1 | 7/2007 | Litkouhi | |
| 2007/0219688 A1* | 9/2007 | Gut et al. | 701/41 |
| 2007/0233343 A1* | 10/2007 | Saito et al. | 701/41 |
| 2008/0047775 A1* | 2/2008 | Yamazaki | 180/443 |
| 2008/0091318 A1* | 4/2008 | Deng et al. | 701/41 |

OTHER PUBLICATIONS

International Search Report for corresponding International Application PCT/SE2007/000727.

Chinese Official Action CH App. 200780100278.4.

\* cited by examiner

OPERATING METHOD AND SYSTEM FOR SUPPORTING LANE KEEPING OF A VEHICLE

BACKGROUND AND SUMMARY

The invention relates to an operating method and system for supporting lane keeping of a vehicle according to the independent claims.

Unintentional lane departure, i.e. leaving the lane or at least a desired position in the lane, is a relevant cause of road accidents involving all sorts of vehicles, including heavy duty, medium duty or light duty vehicles. Besides technical problems, known reasons for such lane departures are driver distraction, inattention or drowsiness. It is known in the art to provide support means for a driver to avoid unintentional lane departure of the vehicle.

US 2006/047390 A1 discloses to use an adaptive torque which will increase or decrease dependent on the lateral deviation of the vehicle from a desired position. A torque can be transmitted to the steering wheel either directly when the vehicle is deviating from the lane centre or when the vehicle is close to a borderline of the road.

US 2006/217860 A1 discloses a lane keeping assistant apparatus which assists a steering force when the vehicle is about to deviate from the lane to provide the driver with improved steering feeling. A position of a vehicle, lane centre locating means, calculation means for calculating a lateral deviation from a desired position relative to the centre and a power source for providing an assist torque are used by an assist torque determining means for determining the assist torque to be provided by the power source. The assist torque determining means gradually reduces the assist torque if the lateral deviation amount is being reduced by a driver's steering operation.

In a paper of M. Montiglio et al., entitled "Development of a lane keeping support system for heavy trucks" published in www.prevent-ip.org/download/Events/20061008-12_ITS_WC_London/TS128/Paper%202180.pdf, a haptic lane keeping support system is described which provides an additional resistant torque to the steering wheel which is opposite to the torque exerted by the driver onto the steering wheel in order to alert the driver that the vehicle is unintentionally about to move out of its lane. During a borderline approaching/crossing and with deactivated direction indicators the system evaluates this event as unintentional and applies an additional resistant torque to the steering wheel to oppose the lane departure.

It is desirable to provide an operating method and system for lane keeping of a vehicle which supports the driver while the driver has still full authority to steer the vehicle.

An operating method according to an aspect of the present invention is proposed for supporting lane keeping of a vehicle, equipped with a steering device for steering the vehicle. The method comprises the steps of providing vehicle related information, providing environment related information, combining vehicle and environment related information, predicting a future trajectory of the vehicle based on vehicle and environment related information, estimating a desired lane position of the vehicle and/or a guiding force, comparing the future trajectory and the desired lane position, deciding if a guiding force is to be provided to the steering device, and, if guiding force is to be provided, defining an amount of said guiding force depending on a hierarchically ordered set describing a predetermined driving behavior of the vehicle, adapting said amount of guiding force depending on the direction in which the vehicle is intended to move and activating one or more actuators for supplying said adapted amount of guiding force to said steering device.

The method is applicable for all kind of vehicles and is in particular suitable for heavy duty, medium duty and light duty vehicles.

One important aspect of the method is that it helps decreasing the risk of unintended departure of the vehicle from a desired lateral position on a road or in a lane of a road, i.e. leaving the lane or the road or a desired position in the lane or on the road The guiding force is exerted onto the steering device which is resistive if counteracting the force applied by the driver onto the steeling device, or supportive if acting in the same direction as the force applied by the driver onto the steering device, thus for instance reducing the effect of e.g. frictional forces acting on the wheels and the like which are experienced by the driver as resistance when operating the steering device. The steering device can be for instance a conventional steering wheel, a joystick, a sliding nipple or any other steering device suitable for steering the vehicle. For instance, in case that the steering device is a steering wheel the guiding force will appear as a guiding torque exerted onto the steering wheel.

Another aspect of the method according to the invention is that the lane keeping support system will provide such— additional—guiding force only in situations in which the supply of such guiding force to the steering device is deemed by the system to be appropriate after the analysis of all input data received by the system.

The driver experiences said guiding force (if applied) as an increasing or increased resistance of the steering device (for instance a steering wheel or joy stick) when operating the steering device in the "wrong", i.e. non-desired way, for instance turning the steering wheel in the "wrong" direction moving the vehicle away from the desired lateral position on the road or in the lane of the road. Compared to that increasing or increased resistance the driver experiences-a decreasing or decreased resistance of the steering device when operating the steering device in the "right", i.e. desired way, for instance turning the steering wheel in the "right" direction moving the vehicle towards the desired lateral position on the road or in the lane of the road.

However, the guiding force can never by itself move the steering wheel as that force can only increase or decrease resistance which the driver experiences when operating the steering device, for instance when turning the steering wheel of the vehicle.

According to a first preferred mode of operation of the lane keeping support system, the guiding force can be either "positive" or "negative" or zero when added to the normal force exerted by the driver and, if applicable, a conventional servo steering system, onto the steering device thus increasing the total resistance experienced by the driver when the steering device is moved in the "wrong" direction and decreasing the total resistance when the steering device is moved in the "right" direction. Preferably, the amount of guiding force can be varied in accordance with operation conditions and/or an actual state of the vehicle. "State of the vehicle" is a summary of relevant properties of the vehicle, such as e.g. lateral position in the lane, lateral velocity, and can also comprise additional geometrical parameters such as e.g. width, length, height, weight of towing vehicle and/or trailer (if attached).

More specifically, the guiding force is deemed to have a positive value if it counteracts the force exerted by the driver and, if applicable, a servo steering system, onto the steering device, i.e. if it acts in the opposite direction of the force exerted by the driver and, if applicable, the servo steering system. Such a positive force is experienced by the driver as an increasing or increased resistance of the steering device when operating the steering device, e.g. turning the steering wheel if the steering device is a steering wheel by way of example.

The guiding force is deemed to have a negative value if it acts in the same direction as the force exerted by the driver and, if applicable, a servo steering system onto the steering device. Such a negative force is experienced by the driver as a decreasing or decreased resistance of the steering device when operating the steering device. The overall effect of a negative guiding force is supporting the driver in operating the steering device and in this respect the supportive effect of such negative guiding force is comparable with the supportive effect the driver experiences due to the force exerted by a conventional servo system onto the steering device. Such a negative force can, for instance, support a servo system by further removing a residual resistance of the steering device.

Zero value means that there is no additional guiding force exerted onto the steering device.

According to second preferred mode of operation of the lane keeping support system, the guiding force can be applied in such a way as to always be positive, i.e. as to always counteract the actions of the driver when moving the steering device in the "wrong" direction and/or in an inappropriate way, thereby increasing the resulting total resistance which the driver experiences when operating the steering device. Preferably, the amount of guiding force can be varied with operation conditions and/or an actual state of the vehicle.

According to a third preferred mode of operation of the lane keeping support system, the guiding force can be applied only in cases when the steering device is moved in the "wrong" direction without adaptation of the amount of force to operating conditions and/or an actual state of the vehicle. When turning the steering device in the "right" direction, a conventional servo steering system can support the driver in the usual (and generally known) way.

Further, the guiding force can be applied to the steering device as a continuous force-function or, alternatively, can be triggered only in situations when the current lateral position of the vehicle deviates from a desired lateral position and/or the vehicle's current state deviates from a desired state of the vehicle.

Advantageously, as described above, a force-function can be provided describing the variation, i.e. the increase and for decrease of the guiding force. The force-function can depend on at least one of the lateral distance from the desired lateral position, the lateral velocity of the vehicle, the lateral acceleration of the vehicle, and the curvature of the lane. The force-function can be a continuous function and e.g. be linearly dependent or can depend in a non-linear form, e.g. be a quadratic dependency, an exponential dependency or the like on at least one of lateral distance, lateral velocity, lateral acceleration of the vehicle and curvature of the lane. The actual force-function is preferably chosen in a way which ensures the driving stability of the vehicle and/or is comfortable for the driver. It is possible to provide different force-functions for different situations, e.g. for travelling a curved trajectory along a bend or for travelling on straight roads. Designing or defining the one or more force-functions can be done by using at least one of the group of an expert system, an artificial intelligence, and fuzzy logic system, considering the hierarchically ordered set describing the desired driving behavior of the vehicle.

Since the lane keeping support system is supposed to encourage the driver to keep the vehicle in the desired lateral position on the road or in the lane of the road, or to move the vehicle towards said desired lateral position, the driver experiences an increasing resistance when he operates the steering device, for instance turns the steering wheel, such that the vehicle is driving in a direction opposite to the desired, i.e. "right", direction towards the desired lateral position or the road or in the lane of the road.

Preferably, the hierarchically ordered set describing the predetermined driving behavior is a set of instructions. Preferably the set is prioritized in the order of
  (i) stabilizing the vehicle;
  (ii) preventing the vehicle from leaving the lane;
  (iii) supporting the turning of the vehicle when driving a curved trajectory on a road, i.e. when the vehicle is driving on a road with a bend in the road wherein the bend is curved and vehicles travelling around or along the bend follow a curved trajectory.

By prioritizing the predetermined driving behavior in this order a driving safety can be achieved in a reasonable way. If the vehicle is not in the desired lateral position or is leaving the desired lateral position, e.g. the centre of the lane of the road, the lateral velocity of the vehicle can be decreased or limited thus stabilizing the vehicle. "Lateral velocity" is to be understood as a velocity lateral to the regular driving direction of the vehicle.

Stabilizing the vehicle in the first instance allows the driver to react to a probably critical situation with the vehicle under full control. Thus, the vehicle can react properly to steering movements of the driver. Even if the vehicle should leave the lane, with a stabilized vehicle a greater level of security is achieved compared to a vehicle which is in an unstable condition. If supporting measures which prevent the vehicle from leaving the lane (with a stabilized vehicle) is prioritized over supporting the turning of the vehicle, the probability that critical situations caused by lane departure will occur can be minimized.

Advantageously, at least one of a lateral displacement, a lateral velocity, a lateral acceleration of the vehicle and a curvature of the road can be used as reliable input variables of vehicle related parameters for selecting the predetermined driving behavior out of the set describing the predetermined driving behavior.

The predetermined driving behavior can be determined by at least one of an expert system, an artificial intelligence system, and a fuzzy logic system. Advantageously, determining the amount of guiding force can be done by at least one of an expert system, an artificial intelligence system, and a fuzzy logic system. Using fuzzy logic, for instance, allows for obtaining a mathematical description of rules which can be used in a computer system although the rules themselves are not verbalized in a mathematical form but in a linguistic form. Favorably, by way of fuzzy a logic system can be controlled in a reasonable manner even if a mathematical relationship between input and output parameters of the system is very complex or cannot even be established. The actual specific value of the guiding force can preferably be set by a fuzzy logic function and is based on at least one of lateral position of the vehicle, lateral velocity of the vehicle, lateral acceleration of the vehicle, and lane curvature.

By using an expert system a selection of the appropriate predetermined driving behavior can be done based on expert knowledge bases. In an expert system the knowledge base is the field of the system which contains expert knowledge in an arbitrary representation form. The knowledge base is supplemented by an inference machine, i.e. a hardware or software which can operate on the basis of the knowledge base. Typical tasks for an expert system can be data interpretation, i.e. analysis of data, particularly understanding the data; survey, i.e. interpretation of data for initiating actions depending on an incidence; prognosis, i.e. anticipating and validating of accessible states of time variant systems.

By using artificial intelligence systems intelligent behavior can be analyzed and used for conclusions for future operations. Repeated operations or informations can be stored as empirical values which are the basis for recognizing regularities. Thus, general rules can be deducted from a multitude of data. An expert system could be understood as a part of an artificial intelligence system.

It is to be understood that each system can be used exclusively. However, a combination of two or more of the systems is also possible.

Preferably, at least the environment related data can be treated with data fusion. Favorably, data fusion allows combining data from multiple^ sources and gathering respective information in order to achieve inferences, which is more efficient than being achieved by means of a single source. Appropriate sensors for collecting the environment related data can be e.g. long range radar to detect objects which might cause an obstacle or oncoming traffic, and lane tracker camera unit as well as digital map data provided by e.g. a remote provider. With object data fusion, objects from environment sensors can be tracked and classified. With lane data fusion, lane data from a digital map data provider can be combined with object data fusion and a lane tracker camera for the purpose of conducting a lane data estimation.

The hierarchically ordered set describing-the predetermined-driving behavior can favorably support several functions if the driver is driving the vehicle e.g. in a lane of a road.

In the following paragraphs aspects of the invention are described when a vehicle is driving on a straight road.

According to the first preferred mode of operation elucidated above, when driving on a straight road the guiding force is selected to be positive and counteracting the current force exerted by the driver onto the steering device in situations where the operation of the steering wheel by the driver causes a current lateral velocity of the vehicle moving the vehicle laterally away from the desired lateral position. The value or amount of the guiding force can be adapted to increase (starting preferably at zero in case the vehicle is in the desired state and/or in the currently desired lateral position with zero lateral velocity) if and the more the vehicle is laterally moving away from the desired lateral position for instance at the centre of the lane.

On the other hand, for driving on a straight road the guiding force can be selected to be
 (1) positive and counteracting the current force exerted by the driver onto the steering device, or
 (2) negative and acting in the same direction as the current force exerted by the driver onto the steering wheel, or
 (3) zero,
in situations where the operation of the driver causes a current lateral velocity of the vehicle moving the vehicle laterally towards the desired lateral position. The value of the guiding force is preferably selected to be
 (i) positive if the value of the current lateral velocity of the vehicle is above the value of a currently desired lateral velocity, and with its absolute amount adapted to increase the more the value of the current lateral velocity of the vehicle deviates from the value of the currently desired lateral velocity (the latter value in turn being a function of at least one of lateral distance from the desired lateral position of the vehicle, properties of the vehicle comprising additional parameters such as e.g. geometrical data (weight, height, length, width of towing vehicle and of trailer (if attached)), and curvature of the lane or road). When the vehicle is moving closer to the desired lateral position the absolute amount of the-desired lateral velocity will decrease. As an example, this means that if the vehicle has a constant lateral velocity and the vehicle is laterally moving closer towards the desired lateral position, for instance at the centre of the lane, the absolute amount of the positive guiding torque is adapted to increase,
 (ii) negative if the vehicle's current lateral velocity is below the currently desired lateral velocity, and with its absolute amount adapted to decrease the more the vehicle is increasing that current lateral velocity towards the currently desired lateral velocity. When the vehicle is moving closer to the desired lateral position the absolute amount of the desired lateral velocity will decrease. As an example, this means that if the vehicle has a constant lateral velocity and the vehicle is laterally moving closer towards the desired lateral position, for instance at the centre of the lane, the absolute amount of the negative guiding torque is adapted to decrease,
 (iii) zero if the vehicle's current lateral velocity is equal to the currently desired lateral velocity during the movement of the vehicle towards the desired lateral position on the road or in the lane of the road, and also at the desired lateral position and zero lateral velocity.

The absolute value of the actual guiding force provided to the steering device will be preferably selected from an interval defined by a lower limit of preferably zero guiding force and an upper limit of a maximum guiding force.

The guiding force is added to the typical force exerted by drivers of a vehicle in such a way that the effect on the operability of the steering device is only moderate, so that even applying maximum guiding force will still guarantee the normal operability of the steering device by the driver.

Further, the guiding force—if applied and if positive, i.e. greater than zero—will always counteract any significant force exerted by the driver onto the steering device and causing a lateral velocity of the vehicle, even in situations where the driver is operating the steering device (turning the steering wheel for instance) in such a way that the vehicle is moving towards the desired lateral position on the road or in the lane of the road. The guiding force—if applied and negative, i.e. smaller than zero—will always act in the same direction as any significant force exerted by the driver onto the steering device and causing a lateral velocity of the vehicle, and will be applied only in situations where the driver is operating the steering device in such a way that the vehicle is moving towards the desired lateral position on the road or. in the lane of the road.

However, exerting too large positive guiding force values and/or applying a too large negative guiding force acting in the same direction as the force exerted by the driver onto the steering device, e.g. a steering wheel, in addition to any servo system already supporting the operation of the steering device in the usual way, would not be comfortable for the driver and could also potentially contribute to destabilize the vehicle. Therefore, when moving the vehicle away from the desired lateral position the guiding force (if applied and if greater than zero) will generally be stronger than in those situations where the guiding force is greater than zero even when moving the vehicle towards the desired lateral position, but in both cases the guiding force still has to be conform to the same boundary conditions and will always counteract the force exerted by the driver onto the steering device and causing any significant lateral velocity of the vehicle. Thus, the actual value of the exerted guiding force will decrease when the lateral velocity of the vehicle decreases and the vehicle moves towards the desired lateral position on the road or in the lane of the road within the given boundaries and increase again in case the vehicle has reached said desired lateral position and passed it moving away from it again, either by continuing the previous direction of lateral movement or by reversing said direction of lateral movement.

As an example, the force-function mentioned above could be a continuous function of a lateral distance of the vehicle, particularly of a towing vehicle, from the desired lateral position, e.g. the centre of the lane. For instance, according to the second preferred mode of operation mentioned above, the guiding force could be zero at the desired lateral position and increase with the lateral distance from the desired lateral position until the maximum guiding force is established.

According to the first preferred mode of operation elucidated above, the force-function can be a continuous function based on, for example, a fuzzy logic system using at least one of a lateral position, a lateral velocity of the vehicle, a lane curvature and possibly even a lateral acceleration of the vehicle as input variables. The value of the guiding force will be provided as the output of this system. By way of example, one appropriate fuzzy rule could be that with no lane curvature present and a high lateral velocity to the left and a lateral position in the left part of the lane, the guiding force would encourage the driver to move the vehicle towards the right side of the lane.

Another appropriate fuzzy rule when moving towards the centre of the lane (as the desired lateral position of the vehicle) with the lateral velocity in an acceptable range would result in a guiding force of zero. If the lateral velocity is deemed to be too small in this situation compared with a desired lateral velocity; the fuzzy rute~woαtdresαltin a negative guiding force giving an additional support onto the steering device (e.g. a steering wheel) when, and as long as, the vehicle is moving towards the desired lateral position, for instance the centre of the lane, thereby reducing the total resistance of the steering device experienced by the driver if the steering wheel is turned in the "right" direction. If the lateral velocity is deemed to be too high in the same situation, the fuzzy rule would initiate a resisting positive guiding force when, and as long as, the vehicle is moving towards the desired lateral position, for instance the centre of the lane.

Generally, if the current lateral position of a vehicle is farther away from the desired lateral position, a larger lateral velocity of the vehicle towards the desired lateral position is acceptable than in situations where the current position of the vehicle is closer to the desired lateral position. The closer the vehicle comes to the desired lateral position, the lower its lateral velocity should be.

In the following paragraph aspects of the invention are described when a vehicle is travelling a curved trajectory along a bend of a road.

For travelling a curved trajectory along a bend the guiding force suggesting to the driver to introduce a lateral acceleration of the vehicle towards an inside of the bend can preferably be different to the guiding force suggesting to the driver to introduce a lateral acceleration of the vehicle towards an outside of the bend. Particularly, for travelling a curved trajectory along a bend the guiding force suggesting to the driver to introduce a lateral acceleration of the vehicle towards an inside of the bend can be established to be greater than for an equivalent situation on a straight road. For travelling a curved trajectory along a bend the-guiding force suggesting to the driver to introduce a lateral acceleration of the vehicle towards an outside of the bend can be established to be lower than for an equivalent situation on a straight road. By way of this the driver is encouraged-to-move-the vehicle towards to a more safe lateral position and to keep it preferably in said position. Also, the guiding force is made more comfortable and intuitive for the driver since initiating a lateral velocity towards e.g. the outside of the bend requires less force than initiating a lateral velocity towards e.g. the inside of the bend.

In the following paragraphs further aspects and advantages of the invention are described.

By providing object data fusion and lane data fusion for environment related information reliable data for lane data estimation can be obtained.

Appropriate data for vehicle related information can be at least one of wheel speed data, yaw rate data and steering wheel angle data. Wheel speed sensors can measure the velocity of each individual wheel of the vehicle. A yaw rate sensor can measure the yaw rate of the vehicle. A steering wheel angle sensor can measure the steering wheel angle of the vehicle.

When driving with a truck and an attached trailer a curved trajectory along a bend, the trailer positions itself closer to the inner side of the bend than the towing vehicle. A conventional lane keeping support system that helps to keep the towing vehicle in the centre of the lane can potentially guide the vehicle in such a way that the trailer crosses the lane border on the inside of a bend. Thus, in a preferred embodiment of the invention, wherein a trailer is attached to the towing vehicle, the desired lateral position for the towing vehicle in a bend can be estimated dependent on the desired lateral position of the trailer. Preferably, the desired lateral position of the towing vehicle can be shifted towards an outside of the bend compared to the lateral position of the trailer. Additionally or alternatively, if the trailer is predicted to leave the lane on the inside of the bend given that the towing vehicle would travel in the centre of the lane, a lane departure warning system can be disabled when the towing vehicle is leaving the lane on the outside of the bend. The driver can do this in order to make it possible for the both towing vehicle and the trailer to travel a curved trajectory along the bend and specifically preventing the trailer from departing the lane on the inside of a bend. Preferably, the warning can stay disabled during the period of time the vehicle is leaving the lane on the outside if the trailer is predicted to stay in such a situation in the lane on the inside of the bend or has to leave the lane on the inside of the bend during such a maneuver.

By steering the towing vehicle in that way on a curved trajectory along a bend, the driver intentionally steers the vehicle to leave the lane e.g. in order to prevent the trailer from entering the lane of the oncoming traffic. Other reasons for doing so can be to prevent the trailer from leaving the lane at a road border or e.g. to prevent the trailer from leaving the lane into an adjacent lane with traffic going in the same direction. Oncoming traffic is to be understood as traffic which is driving in opposite direction of the vehicle, e.g. on a two-way road. This is particularly advantageous if the curvature is large, i.e. a small bend radius and/or a small lane width.

In a preferred embodiment, a predictive "look-ahead" function can be implemented, since the lateral position of the trailer cannot be adjusted-at once. Thus, an early corrective movement of the towing vehicle is possible which can prevent the trailer from leaving the road on the inside of a bend ahead. Centre of the road or centre of the lane means the lateral centre of the road or the lane with regard to the regular driving direction of the vehicle.

According to a further preferred embodiment, a guiding force can be adjusted depending on a classification of the road. Favorably, in case the probability that an adjacent lane exists exceeds a predefined threshold and the system decides to provide a guiding force to prevent a lane departure in that direction, the guiding force can be chosen to be lower than in case no adjacent lane is present. For example, a predefined probability threshold for the probability that an adjacent lane exists can be set to 50%. If a probability that an adjacent lane exists is detected which is more than 50%, the guiding force which may be provided to the steering wheel can be lowered when the vehicle risks to leave the lane to the side of the adjacent lane mentioned above.

Preferably, at a road border with no adjacent lane the guiding force can be higher when the vehicle is moving towards said road border.

Most lane departure warning systems known in the art trigger a warning when the vehicle crosses the lane border or when the predicted time to a lane departure is lower than a fixed threshold. An advantageous embodiment of the invention is to trigger (enable) the lane departure warning when the predicted time to a lane departure is less than a variable threshold. Preferably, the variable threshold is a function of the magnitude of the current lateral velocity of the vehicle. Preferably, the threshold will be smaller for low magnitudes of lateral velocity than for high magnitudes. According to the preferred modes of operation of the invention-described above, the guiding force can be triggered-in-such a-situation where the predicted time to a lane departure is lower than said (variable) threshold. Alternatively, the guiding force can be continuously applied within its limits.

A high threshold at high lateral velocities of the vehicle advantageously gives the driver an earlier warning and therefore more time to react in order to avoid a potential lane departure. This is more important at high lateral velocities than at low lateral velocities since it takes more time to bring the vehicle to a steady-state with regards to lateral velocity.

In case the driver should prefer to drive close to a lane border at zero or low lateral velocity, if the warning is triggered on a high threshold, small errors (e.g. signal noise) on input data result in false alarms, i.e. the warning is activated although the vehicle probably will not cross the lane border in such a situation. To avoid this, the preferred solution elucidated above proposes a low threshold for low or zero lateral velocities in order to minimize in these situations the risk of false alarms. If for instance the threshold is set to zero at low lateral velocities the warning will preferably be triggered when the vehicle actually crosses the lane border. While this is acceptable in case of low lateral velocities of the vehicle, this would not be desirable in case of high lateral velocities since in that situation a low or zero threshold would give the driver considerable less time to react to a potentially critical situation.

In case of a lane departure of the vehicle in lateral direction towards the road centre while travelling a curved trajectory along the bend, a guiding force can be determined according to traffic conditions.

According to a preferred embodiment of the invention, the guiding force is provided depending on expected oncoming traffic. In case oncoming traffic is detected and provided that the system is activated, the guiding force decided to be supplied will be increased in its absolute amount, i.e. for negative and positive values of the guiding force, whatever is applied. Accordingly, the guiding force will guide stronger towards the desired lateral position, i.e. the centre of the lane, thereby reducing the risk of curve-cutting and increasing the vehicle safety.

In a similar way, the guiding force is provided depending on expected overtaking traffic. In case overtaking traffic is detected and provided that the system is activated, the guiding force decided to be supplied will be increased in its absolute amount, thus guiding stronger towards the desired lateral position, i.e. the centre of the lane.

If an intentional lane departure is planned, the guiding force can be deactivated. If the system or guiding force is deactivated, preferably a warning signal can be issued in order to keep the driver alert. Deactivating the system or the guiding force is to be understood in the way that temporarily the lane keeping support system does not provide any guiding force. Basic functions of the system, however, are preferably still enabled, such as sensors surveying oncoming traffic etc. Particularly, when a critical situation is detected, in a preferred embodiment of the system, a guiding force and/or another warning signal can still be provided and/or—as an option—for instance an emergency-braking-maneuver can be initiated, depending on the circumstances.

The system can enter the deactivated state automatically if it is detected that a lane departure is intentional, e.g. if a direction indicator is activated when leaving the lane for overtaking another vehicle. Optionally an intentional departure from a desired lateral position can also be estimated by analysis of the sensor data provided for vehicle and environment related information.

The warning signal can either be a signal warning the driver that the vehicle is going to leave the centre of the lane or a signal warning the driver that the lane keeping support system is currently not providing a guiding force or both. The warning signal can be for instance an optical and/or a haptic and/or an acoustic signal. Preferably, the optical signal is also visible for the driver and the acoustical signal is also audible for the driver, as well as the haptic signal being also tangible for the driver. For instance, the haptic signal could be a tangible vibration of the steering wheel or of the driver's chair (or part of it).

According to another aspect of the invention, a lane keeping support system for a vehicle for performing the method is proposed, having a support unit which comprises a data fusion module for generating environment related information based on at least partly fused data, a trajectory predictor module for predicting a future trajectory of the vehicle, an estimator module for estimating a desired lateral lane position of the vehicle and/or a guiding force and a decision system module for deciding if a guiding force should be provided and, if to be provided, for defining an amount of such guiding force depending on a hierarchically ordered set describing a predetermined driving behavior of the vehicle, adapting said amount of guiding force depending on the direction in which the vehicle is intended to move and activating one or more actuators for supplying said adapted amount of guiding force to the steering device, with one or more inputs for sensor data for the data fusion module, one or more inputs for vehicle related data and one or more outputs for an output of guiding force demand and/or warning signal.

Optionally, an adjacent space classifier can provide input data to the force estimator. The classifier can be a system including sensors which classify the adjacent space to the current lane of the vehicle. The system can determine whether or not the space next to the current lane is adapted for continuing the intended driving, e.g. whether there is another lane next to the current lane serving as an accessible area for the intended operation of the vehicle or e.g. a ditch not permitting such operation. Appropriate sensors can provide information about objects in the adjacent area and/or surface information in the adjacent area. This information can be utilized to estimate the probability that an adjacent lane exists.

The lane keeping support system does not replace the driver or override the driver's will wherein the driver still has full authority over the operation of the vehicle. Particularly, the lane keeping support system can be switched off if the driver does not want an action from the lane keeping support system. When the system is deactivated, reasonably a haptic optical, and/or acoustical warning signal indicates that the system does not provide any guiding force. However, although no guiding force is provided in this state, basic functions can still be active in the background and a guiding force can preferably still be provided if in this state a critical condition is detected.

Furthermore, the level of the guiding force can always be adapted to make it possible for the driver to override the system by turning the steering wheel to an arbitrary position. When the system is active, it is preferably checked with appropriate sensors if the driver has his hands on the steering wheel, for instance using a camera, a capacity sensor coupled to the steering wheel, or the like. This helps to avoid an abuse of the lane keeping support system as an "autopilot".

Another aspect of the invention provides a computer program comprising a software code adapted to perform a method or for use in a method exhibiting at least one of the features elucidated above when said program is run on a programmable microcomputer; adapted to be downloaded to a support unit or one of its components when run on a computer which is connected to the interne.

Further, a computer program product stored on a computer readable medium is proposed, comprising a software code for use in a method exhibiting at least one of the features elucidated above on a computer.

Another aspect of the invention provides a computer program product stored on a computer readable medium, comprising a program code for use in a method for supporting lane keeping of a vehicle equipped with a steering device operated by a driver, the method comprising at least the steps of
combining vehicle and environment related information;
predicting a future trajectory of the vehicle based on vehicle and environment related information;
estimating a desired lateral lane position and/or a guiding force;
comparing the future trajectory and the desired lane position;
deciding if a guiding force is to be provided to the steering device;
if guiding force is to be provided
a) defining an amount of said guiding force depending on a hierarchically ordered set describing a predetermined driving behavior of the vehicle;
b) adapting said amount of guiding force depending on the direction in which the vehicle is intended to move.

Such Computer program product may even comprise a program code for use in such method, where the method also comprises the step of
c) activating one or more actuators for supplying said adapted amount of guiding force to the steering device.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

Figure 1:
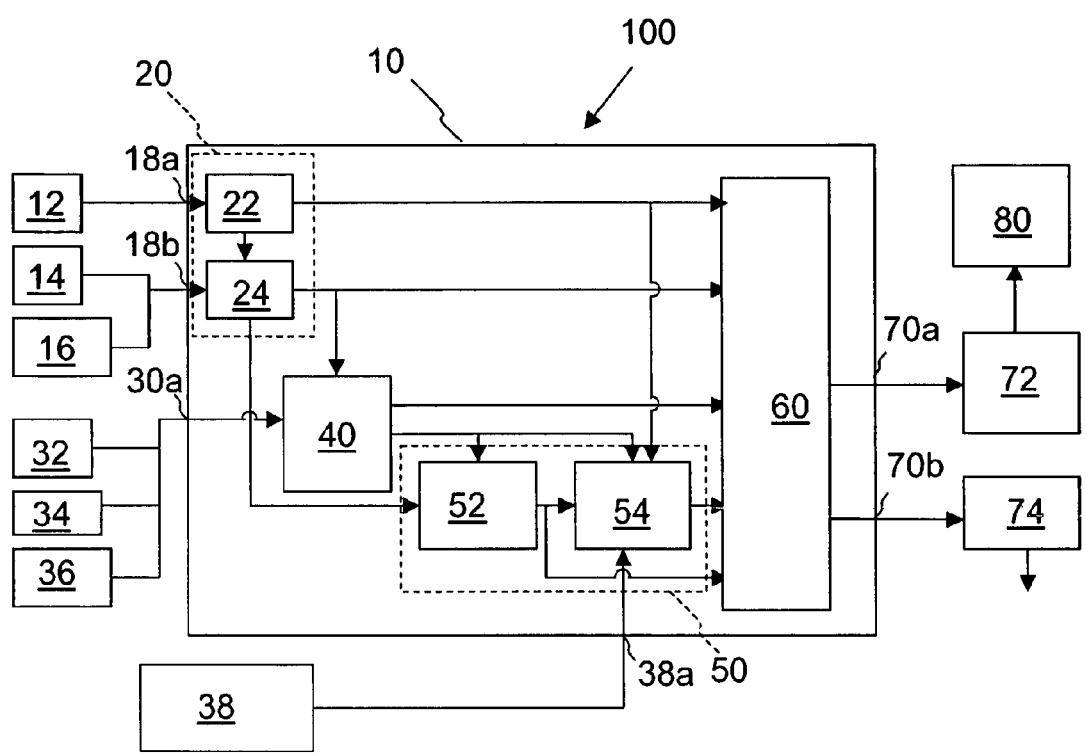
FIG. 1 a schematic sketch of a preferred embodiment of a lane keeping support system according to the invention for providing a lane keeping support.

In the drawings, identical or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

A preferred embodiment of the lane keeping support system 100 according to the invention for a vehicle is depicted in FIG. 1 by way of a schematic sketch. The vehicle (not shown) is for instance a vehicle without any trailer or a towing vehicle with a trailer attached to the towing vehicle.

The lane keeping support system 100 comprises a support unit 10. Various ensors, and units 12, 14, 16, 32, 34, 36, 38 are coupled to the system 100. The support unit 10 encompasses a data fusion module 20 for generating environment related information. Such environment related information is preferably provided by a long range radar unit 12, a lane tracker camera 14 and a digital map provider 16. The long range radar unit 12 comprises a forward-looking radar sensor. The lane tracker camera 14 comprises a vision sensor detecting lane markings, thus providing parameters like width of the road and/or width of the lane and/or the lateral lane offset of the vehicle and/or the lane curvature and the like. The digital map provider 16 provides digital map data from a database, particularly lane information. The map data is mapped to the current vehicle position using e.g. GPS (GPS=Global Positioning System) or other location devices for determining the actual position of the vehicle. The environment related data is supplied to the data fusion module 20 of the support unit 10.

The long range radar 12 data is supplied via an input 18a to an object data fusion unit 22. The long range radar 12 can detect objects in the lane, e.g. oncoming traffic, obstacles and the like. The object data fusion unit 22 tracks and classifies detected objects from environment sensors. The data of the lane tracker camera 14 and of the digital map data provider 16 is supplied via an input 18b to a lane data fusion unit 24 of the data fusion unit 20. The lane data fusion unit 24 combines the lane data from the digital map data provider 16, the object data fusion unit 22 and the lane tracker camera 14 in order to conduct a lane data estimation.

Both units 22, 24 supply data to a decision system module 60 which encompasses a lane keeping support decision system. Further, the object data fusion unit 22 provides data to the lane data fusion unit 24.

An output of the lane data fusion unit -24 is supplied (i) to a predictor module 40 which predicts a future trajectory for the vehicle (without trailer) or the two of vehicle and trailer (if attached) and in parallel (ii) to a lane position estimator module 52 of an estimator module 50 of the support unit 10. Devices (not shown in FIG. 1) are provided for identifying a trailer. The trailer can be equipped with a transponder which can be detected by a vehicle unit, or an electric device such as a microprocessor can be attached to the trailer or a mechanical or electrical coding can be provided which identifies the trailer when being attached to the towing vehicle. Particularly, the devices provide trailer parameters such as its length or distance of the axles and the like. Based on the known geometry of the trailer it is possible to determine a trailer specific turn radius or a trailer specific behavior in bends which can be different from the behavior of the towing vehicle:

The predictor module 40 estimates the future trajectory of the towing vehicle and the trailer relative to the lane using fused lane data and vehicle sensor data. Specifically, the future trajectory of the towing vehicle is predicted and used as input to other modules. Also, the trajectory of the trailer (if attached) is predicted and used as input to the estimator module 50 which provides a desired lane position of the vehicle consisting of or comprising the towing vehicle and the trailer (if attached). In predictor module 40 input variables are used describing the road relative to the vehicle (lateral lane offset, vehicle heading, lane curvature) provided by the lane data fusion. The second group of input data originates from the vehicle sensors, i.e. vehicle yaw rate, vehicle speed and steering wheel angle. By using a combined vehicle and road model, describing the movement of the vehicle in the lane, a prediction of the input variables' future states is estimated. This estimate of the future states is then used as input to the estimator module 50 and the decision module 60.

The predictor module 40 receives vehicle related information generated by one or more wheel speed sensors 32, one or more yaw rate sensors 34 and one or more steering wheel angle sensor 36 through an input 30a. The wheel speed sensors 32 measure the velocity of individual wheels of the vehicle. The yaw rate sensor 34 measures the yaw rate of the vehicle and trailer (if attached), and the steering wheel angle sensor 36 measures the steering wheel angle of the vehicle.

The lane position estimator module 52 is using input from the predictor module 40 and the lane data fusion unit 24 and calculates the desired lateral lane position of the towing vehicle. For small future curvature values the desired lateral lane position is usually in the centre of the lane. For larger curvature values the desired lateral lane position preferably will differ from the lane centre to prevent the trailer from leaving the lane at the inside of the bend.

A force estimator module 54 of the estimator module 50 receives input from the lane position predictor 52, the object data fusion unit 22 and the predictor module 40 as well as—optional—via input 38a from an adjacent space classifier unit 38. The force estimator module 54 determines the value of the guiding force for different situations where a lane departure may occur.

The optional adjacent space classifier unit 38 encompasses a system, preferably including sensors, which classifies the adjacent space to a lane currently used by the vehicle. The system determines—whether or not the space next to the current lane is adapted for driving, e.g. whether or not there is another lane (suitable for driving) next to the lane currently used by the vehicle. The sensors that could be used are e.g. radar, ultrasonic, laser or vision. The sensors can provide information about objects in the adjacent area and/or surface information in the adjacent area, e.g. if there is soil or asphaltic surface or the like. This information can be used to estimate the probability that an adjacent lane exists.

Information originating from the object data and lane data fusion units 22, 24 (fused object and lane data), the predictor module 40 (future trajectory), the force estimator module 54 and the lane position estimator module 52 is supplied to the decision module 60. The decision module 60 decides when a guiding force and/or warning signals should be activated, particularly it decides if, when and how the system 100 should use or activate respective activators.

If the decision is to provide a guiding force, a guiding force demand is issued to an electrical power steering unit 72 attached to an output 70a of the decision module 60. The power steering unit 72 activates an actuator (for instance an electric motor 80) which is attached e.g. to a conventional servo steering device being operationally connected with the steering wheel (not shown in FIG. 1). The power steering unit 72 and the electric motor 80, respectively, superimpose the guiding force as a guiding torque to the conventional operation of the servo steering device in accordance with the control signals of the decision module 60.

If the decision is that a warning signal should be issued, a HMI warning device 74 (HMI=Human-Machine-Interface) attached to another output 70b of the decision module 60 is activated. Such a warning signal can be e.g. an acoustical, particularly audible, optical, particularly visible, and/or a haptic, particularly tangible, signal. Optical and/or acoustical and/or haptic devices are used to warn the driver of an unintended lane departure, preferably additional to supplying a guiding force, or that the lane keeping support system is deactivated.

Figure 2:
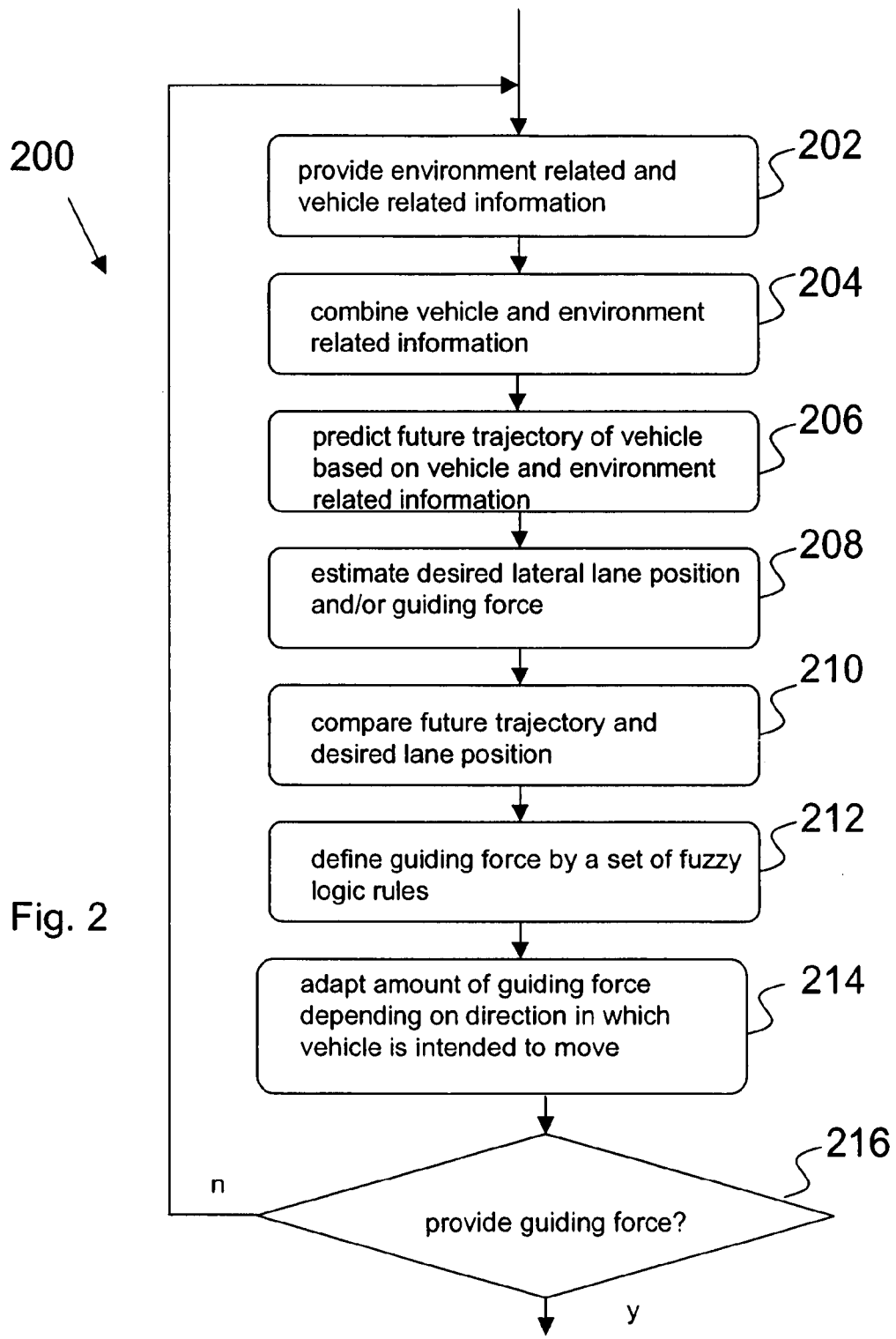
FIG. 2 a flow chart depicting steps of a preferred embodiment of the operating method according to the invention.

Referring now to FIG. 2, a preferred embodiment of the method according to the invention for providing a guiding force in form of a guiding torque to a steering wheel of a vehicle to enable lane keeping support is depicted by way of a flow chart 200. The components of a preferred system have been elucidated above. For details of the system it is referred to the description of FIG. 1. In this embodiment, by way of example, fuzzy logic rules are used for defining the amount of support.

In step 202 vehicle related information is provided to a predictor module 40 by sensors 32, 34, 36 (FIG. 1) and environment related information is provided by units 12, 14, 16 as described above (FIG. 1). Fused lane data and fused object data are generated by data fusion units 24 and 22 of a data fusion module 20 (FIG. 1). In step 204 vehicle related information and fused environment related information is combined in a predictor module 40 (FIG. 1) to estimate a prediction of a future trajectory of the vehicle in step 206. In step 208 a desired lane position of the vehicle and a guiding force is estimated. For doing so, the future trajectory information generated in predictor module 40 is supplied to a lane position estimator module 52 and to a force estimator module 54 of an estimator module 50 (FIG. 1). Position estimator module 52 receives also fused lane data, and force estimator module 54 receives fused object data from unit 22 as well as—optional—data from an adjacent space classifier unit 38 (FIG. 1).

The guiding force is (as an example) defined by a set of fuzzy logic rules in step 212 which are prioritized in the order of (1) stabilizing the vehicle;
(2) preventing the vehicle from leaving the lane;
(3) supporting the turning of the vehicle when travelling a curved trajectory along a bend.

At least one of lateral displacement, lateral velocity, lateral acceleration of the vehicle, and curvature of the road are used as input variables of the fuzzy logic. In step 214 the amount of guiding force is determined depending on the direction in which the vehicle is intended to move in order to avoid or minimize an unintentional lateral lane departure of the vehicle, wherein the guiding force is determined according to an actual situation.

According to a first preferred mode of operation of the lane keeping support system, the guiding force can be either positive or negative when added to the normal force, particularly torque, particularly to the action of a conventional servo steering system, thus increasing the total resistance experienced by the driver when the steering device is moved in one ("wrong") direction and decreasing the total resistance experienced by the driver when the steering device is moved in the other ("right") direction. Preferably, the amount of guiding force can be varied with operation conditions and/or an actual state of the vehicle.

According to a second preferred mode of operation of the lane keeping support system, the guiding force can be applied in such a way as to always be positive, i.e. as to always counteract the actions of the driver when moving the steering device in the "wrong" direction and/or in an inappropriate way, thereby increasing the resulting total resistance which the driver experiences when operating the steering device. Preferably, the amount of guiding force can be varied with operation conditions and/or an actual state of the vehicle.

According to a third preferred mode of operation of the lane keeping support system, the guiding force can be applied only in cases when the steering device is moved in the "wrong" direction without adaptation of the amount of force to operating conditions and/or an actual state of the vehicle. When turning the steering device in the "right" direction, a conventional servo steering system, if available, can support the driver in the usual way.

By way of example specific situations are described below in which such adaptations are done. More specifically, the fuzzy rule base gives the guiding force function the following properties:

(1) Scenario: Driving on a Straight Road

When driving on a straight road, wherein the straight road preferably is defined by a curvature below (and hence a curvature radius above) a certain predefined threshold.

(1a) Driving on a straight road and laterally moving away from a desired lateral position When the vehicle is moving away from a desired lateral position, e.g. the centre of the lane, applying a positive guiding force provided by the lane keeping support system will encourage the driver to operate/turn the steering wheel in the opposite direction of the current lateral velocity of the vehicle.

This is achieved by increasing the amount of guiding force supplied to the steering device which counteracts the force exerted by the driver and, if applicable, a servo steering system, onto the steering device (for instance a steering wheel). Thus the guiding force acts in the opposite direction of the force exerted by the driver and, if applicable, the servo steering system, which is experienced by the driver as an increasing or increased total resistance of the steering device when operating the steering device, e.g. turning a steering wheel. The guiding force is starting preferably at zero at the current lateral position of the vehicle with the desired lateral velocity-estimated t>y the system or, alternatively, when the vehicle is at the desired lateral position with zero lateral velocity.

Preferably, the amount of guiding force is increased the more the vehicle is moving away from the desired lateral position and, in a further modification of the method, the more the lateral velocity increases. This increasing guiding force is experienced by the driver as an increasing resistance when turning the steering wheel in the "wrong" direction (causing the vehicle to move away from the desired lateral position) or in an inappropriate way.

It should be mentioned that the decision to provide a negative or a positive guiding force is depending on the direction in which the steering device is moved and not automatically in the direction the vehicle is moving. Thus it can happen that the guiding force in the example elucidated above can also be negative although the vehicle is transiently moving away from the desired lane position. This is the case, for instance, when the driver wants to stop the movement away from the desired lateral position and starts to move the steering device, e.g. the steering wheel, to the "right" direction. The vehicle is still moving away from the desired lateral position until the driver has moved the steering device long enough, e.g. a few seconds. After this time, the vehicle starts moving to the desired direction according to the movement of the steering device, resulting in transiently applying a negative guiding force (here torque) when the vehicle is still moving away from the desired position.

When moving away from the desired position, all three operation modes of the lane keeping system can be applied. The lane keeping support system can also switch from one mode of operation to another of the three modes, depending on circumstances.

(1b) Driving on a straight road and laterally moving towards a desired lateral position When the vehicle is moving towards a desired lateral position, e.g. the centre of the lane, applying a guiding force provided by the lane keeping support system will encourage the driver to operate the steeling device/turn the steering wheel in such a way that the actual lateral velocity of the vehicle is following a desired lateral velocity estimated by the lane keeping support system. In particular, the system will in the beginning of the operation (when the lateral velocity of the vehicle is zero) encourage the-driver to operate the steering device/turn the steering wheel in such a way that the a lateral velocity directed towards the desired lateral position is created causing the vehicle to move towards the desired lateral position. However, the more the vehicle is laterally approaching the desired lateral position on the road or in the lane, the system will gradually encourage the driver to operate the steering device/turn the steering wheel in the opposite direction in order to gradually reduce the lateral velocity of the vehicle, thereby enabling a "smooth", i.e. (more or less) asymptotic approach of the vehicle's actual lateral position towards the desired lateral position and to prevent the vehicle from "overshooting" that desired lateral position.

The potential risk that "overshooting" happens during a maneuver where the vehicle is laterally approaching a desired lateral position on the road or in the lane of the road is effectively reduced by the lane keeping support system by increasing the amount of a positive guiding force supplied to the steering device/steering wheel in case the current lateral velocity of the vehicle is greater than the estimated desired lateral velocity and this gap is increasing (or at least not decreasing) in particular during the end phase of the maneuver where the vehicle eventually approaches the desired lateral position and the desired lateral velocity decreases continuously (being zero at the desired lateral position). This positive guiding force is experienced by the driver as a resistance when turning the steering wheel too much in the direction of the desired lateral position causing the vehicle to move too fast towards the desired lateral position which potentially could result in the vehicle "overshooting", i.e. moving past the desired lateral position.

In the embodiment of the invention described, the guiding force can be (i) a positive force which increases the total force causing a resistance experienced by the driver when operating the steering device/turning-the steering wheel as well as (ii) a negative force which decreases the total force experienced by the driver when operating the steering device/turning the steering wheel.

In general, the guiding force is a function of the lateral velocity if the vehicle moves towards the desired lateral position, as well as other appropriate variables. This means that the actual lateral velocity of the vehicle starts at the starting lateral position of the vehicle with zero value and increases subsequently supported (i) by a negative (i.e. supportive) guiding force in case the actual value of the current lateral velocity is lower than the actual value of the desired lateral velocity, which is a function of time- and/or tateral position, e.g. in form of a bell shape-type or sinusoidal-type function, (ii) by zero guiding force if the actual lateral velocity corresponds to the actual value of the desired lateral velocity, and (iii) by a positive (i.e. resistive) guiding force, in case the actual value of the current lateral velocity is higher than the actual value of the desired lateral velocity.

When at the desired lateral position on the road or in the lane of the road, in practice the vehicle may—during the period of driving on the road—laterally move around that desired position resulting in driving pattern where the vehicle consecutively switches multiple times between driving scenarios corresponding to case 1b (moving towards the desired lateral position) and case 1a (moving away from the desired lateral position), depending on the driving behavior of the driver. At some periods of time these driving patterns show also periods where the vehicle stays at a lateral position with zero lateral velocity (for instance at the desired lateral position), and at some other periods of time they show a direct switching between these two scenarios corresponding to case 1a and case 1b.

For instance, the driver may drive along a road on a trajectory parallel to a trajectory representing the desired lateral positions along the road. In this case, the lateral velocity of the vehicle is zero. As long as the driver does not move the steering device, the lane keeping support system is inactive. If the driver starts to move the steering device in order to drive the vehicle towards the desired lateral position, a non-zero lateral velocity has to be created which cannot be done instantaneously. On one hand, the time for reaching the desired lateral velocity should be short. On the other hand, the vehicle should be kept in a stable state, resulting in accelerating the lateral movement of the vehicle up to the desired lateral velocity within predetermined limits. If the vehicle has reached the desired lateral velocity in a stable state, the guiding force can be zero. Approaching the desired lateral position means that the desired lateral velocity becomes smaller and smaller and approaches zero in the desired position. Thus, if the vehicle increases its actual lateral velocity above the desired lateral velocity, e.g. when the driver turns the steering wheel too fast, the driver will experience a resistant (positive) guiding force on the steering device encouraging the driver to decrease the actual lateral velocity. If the vehicle's actual lateral velocity is below the desired lateral velocity, the driver will experience a supporting (negative) guiding force, making turning the steering wheel easier encouraging the driver to increase the actual lateral velocity, thus acting as a (additional) servo steering system. When driving along a road, the actual curve of the desired lateral velocity can preferably continuously adapt to the respective parameters determining a momentary curve of the desired lateral velocity, e.g. when straight road portion steadily passes into a bend and vice versa passes from a bend portion to a straight road portion.

Generally, the guiding force preferably can be negative if the actual lateral velocity is below the actual desired lateral velocity, positive if the actual lateral velocity is above the actual desired lateral velocity, and zero if the actual lateral velocity is equal or almost equal to the actual desired lateral velocity. This relates to the first preferred mode of operation of the lane keeping support system.

However, the lane keeping support system also operate according to the second preferred mode of operation, wherein a positive guiding force is applied to the steering device which adapts in its strength to the actual operating conditions and state of the vehicle.

The lane keeping support system can also operate according to the third preferred mode of operation of the lane keeping support system, wherein the guiding force can be applied only in cases when the steering device is moved in the "wrong" direction without adaptation of the amount of force to operating conditions and/or an actual state of the vehicle.

It is even possible to combine at least two of the modes of operation depending on operating conditions and/or an actual state of the vehicle.

The desired lateral velocity can be a function of one, or several, of the variables time, lateral deviation from the desired lateral position, and curvature of the road or lane and is preferably a function with a maximum or a maximum plateau and two inflection points on each side of the maximum or the maximum plateau, e.g. any function with a bell-shaped curve, as for instance a—sinusoidal curve—or a Gaussian-shape curve, or a function with for instance a trapezoidal curve showing a linear increasing and decreasing slope connected by a plateau, or with a triangular shaped curve. The curves of the function can be symmetrical or asymmetrical.

Preferably, the respective curve starts at one end with a desired lateral velocity of zero at the lateral starting position of the vehicle separated from the desired lateral position and smoothly approaches at the other end the desired lateral position with a desired lateral velocity of zero. In between the starting point of the curve at the lateral starting position and the endpoint at the desired lateral position the curve can exhibit any appropriate, symmetric or asymmetric shape; —depending-on the circumstances.

The system 100 (FIG. 1) controls the output of actuators, e.g. a steering signal based on a sensed position of the vehicle relative to the road/lane and vehicle sensors such as yaw rate, steering angle etc., so as to use the actual position and the predicted future position to generate adequate control signals.

(2) Scenario: Travelling a Curved Trajectory Along a Bend

When travelling a curved trajectory along a bend (2a) the guiding force provided by the lane keeping support system towards the inside of the bend will be preferably greater than it is for the equivalent situation on a straight road;

(2b) the guiding force provided by the lane keeping support system towards the outside of the bend will be preferably lower than it is for the equivalent situation on a straight road.

The curvature is defined as a reciprocal value of the curvature radius. Thus, if a straight road is defined by a curvature below a certain predefined curvature threshold, i.e. if the curvature is less than that limit, a bend in the road can be defined by the curvature threshold, i.e. a bend in the road is recognized if the curvature is larger than that limit. This means that the road is curved at its bend.

Figure 3:
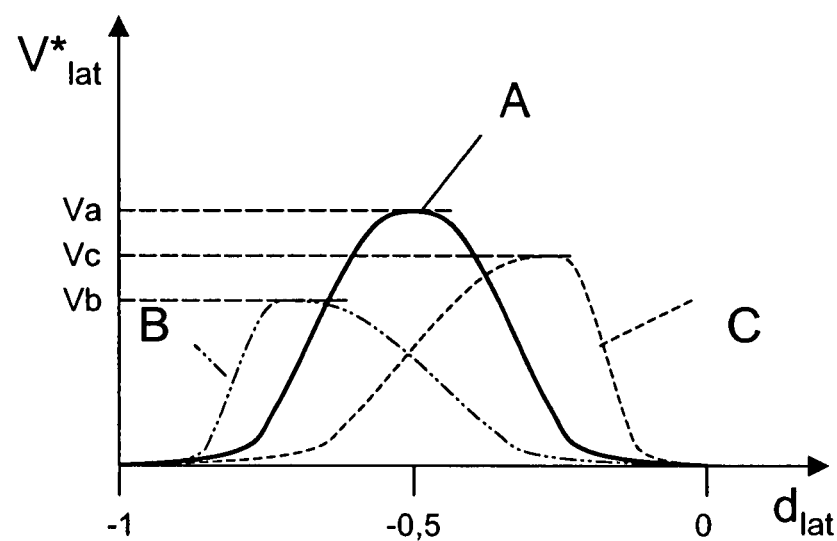
FIG. 3 examples of some possible variations of desired lateral velocities in dependence of lateral deviations from a desired position of the vehicle according to a preferred embodiment of the invention.

By way of example FIG. 3 depicts curves A, B, C representing each an example of a characteristic desired lateral velocity v*lat in functional dependence of a lateral displacement dlat of the actual lateral position of the vehicle from its desired lateral position under different conditions. The lateral displacement dlat and the desired lateral velocity v*lat are shown in arbitrary units. Of course, the functional dependencies of the desired lateral velocity v*lat on the lateral displacement dlat can, have other shapes depending on the precise circumstances of the actual situation.

The symmetric bell-shaped curve A represents the case for a straight road. Starting at a starting point of dlat=−1 at the lateral position of the vehicle before it moves towards the desired lateral position, with e.g. a zero desired lateral velocity v*lat, the desired lateral velocity v*lat will be zero again at the endpoint=0 at the desired lateral position. Thus, curve A shows a maximum value of Va at dlat=−0.5 with a positive slope from the starting point towards the maximum and a negative slope from the maximum towards the endpoint dlat=0.

In a bend with a lateral movement of the vehicle towards the inner side of the bend in order to reach the desired lateral position dlat=0, the maximum of the curve is shifted towards the starting point dlat=−1, as indicated by curve B. Starting from the starting point dlat=−1, v*lat in curve B starts asymptotically and increases until the maximum value Vb is reached before half of the way to the desired lateral position at dlat=0 is reached and decreases again to reach the desired lateral position dlat=0 asymptotically with v*at =0. The slope of curve B at the starting point dlat=−1 is steeper than towards the endpoint dlat=0.

In a bend with a lateral movement of the vehicle towards the outer side of the bend in order to reach the desired lateral position dlat=0, the maximum of the curve is shifted towards the endpoint dlat=0, as indicated by curve C. The maximum value Vc of this curve C can be larger than the maximum value Vb of curve B where the vehicle is moving in the opposite direction towards the inner side of the bend. The slope of curve C at the starting point dlat=−1 is lower than towards the endpoint dlat=0.

If an actual lateral velocity of the vehicle is below the respective curves A, B or C the lane keeping support system will try to encourage the driver to increase the lateral velocity of the vehicle by outputting a negative guiding force applied to the steering device when the vehicle is moving towards the desired lateral position dlat=0. If the actual lateral velocity of the vehicle is above the desired lateral velocity given by A, B or C, the lane keeping support system will try to encourage the driver to decrease the actual lateral velocity of the vehicle by outputting a positive guiding force applied to the steering device when the vehicle is moving towards the desired lateral position dlat=0.

By way of example some situations are discussed below where a lane departure can occur.

One preferred use of the described method and system is for driving a truck with a towing vehicle and an attached trailer. In bends the trailer positions itself closer to the inner side of the bend than the towing vehicle. A lane keeping support system that helps to keep the towing vehicle in the centre of the lane can potentially guide the vehicle in such a way that the trailer would cross the lane border on the inside of a bend. Therefore, in a preferred embodiment the lane keeping support system 100 shifts the desired lateral position of the vehicle further towards the outside of the bend to ensure that the trailer does not pass the lateral border of the lane on the inside of the bend. Since the lateral position of the trailer and the towing vehicle cannot be adjusted momentarily, preferably, this adjustment can be achieved "in time" by using an appropriate predictive "look-ahead" system which enables a corrective movement of the vehicle early enough to move the trailer away from the road centre.

A lane departure warning, as well as the supply of guiding force, can be disabled when the vehicle is leaving the lane, in a situation where the trailer is predicted to leave the lane on the inside of the bend. In such a case the towing vehicle may have to drive at the outer edge of the lane or even leave the lane at the outer edge in order to enable that the trailer may drive at the inner edge of the lane (or perhaps even use—if necessary and admissible—the adjacent lane). The purpose of disabling the warning in such a situation is to avoid unwanted warnings caused by a correct driving behavior, as for instance, when the driver causes the towing vehicle to leave the lane with the towing vehicle on the outside of the bend with the intent to keep the trailer from leaving the lane at the inside of the bend.

A warning can also be disabled if the vehicle is leaving the centre of the lane or the desired position in the lane. This can happen for example when the vehicle intends to overtake an obstacle in the lane. If there is an obstacle on the road within the lane the vehicle has to overtake it in an appropriate way either by overtaking it on the right or left side depending on the circumstances. Disabling the lane departure warning in such a situation avoids unwanted warnings caused by correct driving behavior.

Preferably, the guiding force can also be disabled at crossroads as well as when driving through a city with narrow roads and/or many obstacles on the road. It can be appropriate to disable the warning, too, in order to avoid disturbances of the driver.

Another preferred use of the described method and system refers to the type of space adjacent to the actual lane. Unintended lane departure will less likely result in loss of road friction if an adjacent lane is present than if not present. Therefore, drivers may feel more comfortable with a higher level of guiding force at a road border and a lower level of guiding force at a lane border separating two lanes adapted for driving with a vehicle. When an adjacent lane is detected, the (positive) guiding force, when the vehicle is deviating from its current lane toward that adjacent lane, can be lower than the guiding force when the vehicle is deviating from its current lane and no such adjacent lane is detected in that direction, particularly if there is a ditch or a parapet of a bridge or a safety fence or the like instead of a lane or at least a flat roadside which is adequately level to the lane. It is considered to be more severe to leave the present lane in such a case. Hence, if the outside of one of the present lane borders is not adapted for driving there can be a stronger guiding force—for correcting the lane keeping to the present desired lateral position on the lane—on that actual side of the lane where the vehicle currently is positioned and where said critical area outside the lane border is detected.

Thus, the guiding force can be provided depending on a classification of the road. In case an adjacent lane is present and a lane departure risk is detected, the guiding force can be chosen to be lower than in case no adjacent lane is present. At a road border with no adjacent lane the guiding force can be higher in lateral direction of the road border.

In another preferred application of the method and system, in case of a lane departure in a bend in lateral direction towards the road centre, a guiding force can be determined according to traffic conditions. The guiding force is for instance provided depending on expected oncoming traffic. If oncoming traffic is detected moving in the opposite direction than the vehicle, preferably, the guiding force can be increased. Further, preferably, one or more warning devices can be activated in order to increase the alertness of the driver and warn him of the traffic. Reasonably, the same can be done if overtaking traffic is detected (i.e. one or more vehicles performing overtake maneuvers).

If the lane is narrow in relation to the lateral and longitudinal dimensions of the vehicle and the trailer (if attached) the guiding force can be deactivated or decreased, resulting in a weaker resistance experienced by the driver when operating the steering device/steering wheel, and/or the lane departure warning can be disabled: This-is-to avoid unwanted warnings/support if the driver wants intentionally to drive closer to the middle of a narrow two-way road (road with two lanes, with one lane for each direction) to reduce the risk of running of the road on the outer side of the road.

In some cases, the driver may want to leave the lane or the desired position in the lane intentionally. For example, when an obstacle in the actual lane has to be passed, the vehicle may have to leave the current lane and may have to move towards the middle of the road or even into the lane of oncoming traffic or move towards the outer edge of the road depending on the situation in the individual case.

On two-way roads, in case that a truck driver wants to position the vehicle at a lateral position closer to the road centre than the centre of the lane, provided that there is no traffic in the opposite direction (oncoming traffic) and no overtaking traffic, the lateral distance to the edge of the road can be increased and the vehicle kept at a lateral position closer to the road centre than the centre of the lane. Doing so reduces the risk of an unintended road departure at the outside of the road. The lane keeping support system can support this by surveying the area for oncoming traffic and overtaking traffic.

When driving on a narrow two-way, two-lane road, the guiding force provided by the lane keeping support can be adapted to provide lower levels of force when the vehicle is deviating from the lane centre towards the middle of the road. However, guiding force provided in case of lateral deviation by the vehicle towards the outer border of the road is preferably unchanged. A combination of both is possible. The lane keeping support system can support this by surveying the area for oncoming traffic and overtaking traffic.

In the case of the driver's desire to keep the vehicle near the centre line of the road, which happens e.g. in driving situations called "curve-cutting", where the centre line is on the inside of a bend, provided that there is no oncoming traffic and overtaking traffic, the lane keeping support system can assist the driver in such situations to keep the vehicle near the centre line and/or the steering support system by providing lower levels of guiding force for correcting the position to the centre of the lane. Particularly, only adapting warning/guiding force is supplied when no oncoming traffic and overtaking traffic is detected. Preferably, a forward looking ACC-radar (ACC=Automated Cruise Control) or similar devices can be used for this purpose. However, when oncoming traffic or overtaking traffic is detected the lane keeping support system can assist the driver to keep the vehicle in the centre of the lane thereby-avoiding that the vehicle is curve-cutting.

It should be noted that the use of the terms "left" and "right" related to a direction in the description is based on right side traffic and will be opposite for left side traffic.

The invention can be implemented in software or hardware or a mixture thereof.

The invention can also be implemented in a computer program product stored on a computer readable medium or a medium accessible by a computer, comprising a software code for use in the method as described on a computer. The medium can be any medium known in the art where a software program-can be included, such as magnetic, optical, electric, electronic device, e.g. DVD or CD or the like, etc. for storing the program or a medium for transporting the program or transmitting the program.

According to another aspect of the invention, a computer program is proposed, comprising a computer program code adapted to perform a method or for use in a method according to any of the aspects described above, when said program is run on a programmable microcomputer. The computer program can be adapted to be downloaded to a support unit or one of its components when run on a computer which is connected to the internet.

The invention allows for increasing the safety of vehicles, particularly of trucks with attached trailers as well as for increasing the driving comfort. While the driver has full control of the vehicle, the invention supports the driver by generating a guiding force giving a safe feeling on the steering wheel and encouraging the driver to move the vehicle into a desired lateral position on the road or lane. The driver can deactivate the system if an intentional lane departure is planned, e.g. due to traffic conditions like overtaking a slower vehicle or driving around an obstacle in the actual lane.

The invention claimed is:

1. An operating method for supporting lane keeping of a vehicle equipped with a steering device, comprising
   providing vehicle related information;
   providing environment related information;
   combining vehicle and environment related information;
   predicting a future trajectory of the vehicle based on vehicle and environment related information;
   estimating a desired lateral lane position of the vehicle and/or a guiding force;
   comparing the future trajectory and-the-desired lateral lane position;
   detecting whether a force is exerted on the steering device by a driver;
   providing a guiding force to the steering device when the force is exerted on the steering device by the driver; and
   when providing the guiding force,
   a) defining an amount of the guiding force depending on a hierarchically ordered set describing a predetermined driving behavior of the vehicle,
   b) adapting the amount of guiding force depending on the direction in which the vehicle is intended to move, and
   c) activating one or more actuators for supplying the adapted amount of guiding force to the steering device.

2. The method according to claim 1, wherein the-predetermined driving behavior is prioritized in the order of
   stabilizing the vehicle;
   preventing the vehicle from leaving the lane;
   supporting the turning of the vehicle when travelling a curved trajectory along a bend.

3. The method according to claim 1, comprising using at least one of a lateral displacement, a lateral velocity, a lateral acceleration of the vehicle and a curvature of the road as input variables of the predetermined driving behavior.

4. The method according to claim 1, comprising determining the amount of guiding force by at least one of an expert system, artificial intelligence system, fuzzy logic system.

5. The method according to claim 1, wherein for driving on a straight road the guiding force is adapted to increase if the lateral velocity of the vehicle increases when the vehicle is laterally moving away from the desired lateral position.

6. The method according to claim 1, wherein for driving on a straight road the guiding force is adapted according to desired driving conditions and/or a desired state of the vehicle.

7. The method according to claim 1, wherein when moving towards a desired lateral position the guiding force is negative if the actual lateral velocity is below the actual desired lateral velocity, positive if the actual lateral velocity is above the actual desired lateral velocity, and zero if the actual lateral velocity is equal or almost equal to the actual desired lateral velocity.

8. The method according to claim 1, wherein when moving towards a desired lateral position the desired lateral velocity is at least a function of time and/or lateral deviation from the desired lateral position and/or curvature of the road or lane.

9. The method according to claim 8, wherein the desired lateral velocity is a function with a maximum and two inflection points on each side of the maximum, the inflection points preferably each having a value equal to or almost equal to zero.

10. The method according to claim 1, wherein the guiding force increases or decreases a resistance of the steering device counteracting the force exerted by the driver onto the steering device.

11. The method according to claim 1, wherein the guiding force always counteracts the actions of the driver when moving the vehicle away from a desired position and/or a desired state of the vehicle.

12. The method according to claim 1, wherein the guiding force is triggered only when moving the vehicle away from a desired position and/or a desired state of the vehicle.

13. The method according to claim 1, wherein for travelling a curved trajectory along a bend the guiding force towards an inside of the bend is different to the guiding force towards an outside of the bend.

14. The method according to claim 13, wherein for travelling a curved trajectory along a bend the guiding force towards an inside of the bend is adapted to be greater than for an equivalent situation on a straight road.

15. The method according to claim 13, wherein for following a curved trajectory along a bend the guiding force towards an outside of the bend is adapted to be lower than for an equivalent, situation on a straight road.

16. The method according to claim 1, comprising providing object data fusion and lane data fusion for environment related information.

17. The method according to claim 1, comprising providing at least one of wheel speed data, yaw rate data and steering wheel angle data as vehicle related information.

18. The method according to claim 1, wherein the lane keeping support system and/or a lane departure warning system is/are disabled when, and during the period of time, the vehicle is intentionally moved away from the desired lateral position.

19. An operating method for supporting lane keeping of a vehicle equipped with a steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
providing a guiding force to the steering device; and when guiding force is provided,
a) defining an amount of the guiding force depending on a hierarchically ordered set describing, a predetermined driving behavior of the vehicle,
b) adapting the amount of guiding force depending on the direction in which the vehicle is intended to move, and
c) activating one or more actuators for supplying the adapted amount of guiding force to the steering device,
wherein with a trailer attached to the vehicle, the desired lateral position for the vehicle following a curved trajectory along, a bend is estimated dependent on the desired lateral position of the trailer.

20. The method according to claim 19, wherein the desired lateral position of the vehicle is shifted towards an outside of the bend compared to the lateral position of the trailer.

21. The method according to claim 19, wherein the lane keeping support system and/or a lane departure warning system is/are disabled when, and during the period of time, the vehicle is leaving the lane on the outside if the trailer is predicted to stay at, or leave the lane on, the inside of the bend.

22. An operating method for supporting lane keeping of a vehicle equipped with a steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
providing a adding force to the steering device; and when guiding force is provided,
a) defining an amount of the guiding force depending, on a hierarchically ordered set describing a predetermined driving behavior of the vehicle,
b) adapting the amount of guiding force depending on the direction in which the vehicle is intended to move, and
c) activating one or more actuators for supplying; the adapted amount of guiding force to the steering device,
wherein guiding force is provided depending on a classification of the road.

23. The method according to claim 22, wherein in case the probability that an adjacent lane exists exceeds a predefined threshold and it is decided to provide a guiding force to prevent a lane departure in that direction, the guiding force is chosen to be lower than in case no adjacent lane is present.

24. The method according to claim 22, wherein at a road border with no adjacent lane the guiding force is higher in direction of the road border.

25. An operating method for supporting, lane keeping of a vehicle equipped with a steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
providing a guiding force to the steering device; and when guiding force is provided,
a) defining an amount of the guiding force depending on a hierarchically ordered set describing a predetermined driving behavior of the vehicle,
b) adapting the amount of guiding force depending on the direction in which the vehicle is intended to move, and
c) activating one or more actuators for supplying the adapted amount of guiding force to the steering device,
wherein in case of a lane departure when travelling along a bend in lateral direction towards the road centre, a guiding force is determined according to traffic conditions.

26. The method according to claim 25, wherein the guiding force is provided depending on expected oncoming traffic.

27. The method according to claim 25, wherein the guiding force is provided depending on expected overtaking traffic.

28. An operating method for supporting lane keeping of a vehicle equipped with a steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
providing a guiding force to the steering device; and when guiding force is provided,
  a) defining an amount of the guiding force depending on a hierarchically ordered set describing a predetermined driving behavior of the vehicle,
  b) adapting die amount of guiding, force depending on the direction in which the vehicle is intended to move, and
  c) activating one or more actuators for supplying the adapted amount of guiding force to the steering device,
wherein a lane departure warning and/or a guiding force is enabled when the predicted time to a lane departure is less than a variable threshold.

29. The method according to claim 28, wherein the variable threshold is a function of the magnitude of the lateral velocity of the vehicle, and the variable threshold preferably increases with increasing lateral velocity of the vehicle.

30. A lane keeping system of a vehicle equipped with a steering device, comprising
a support unit comprising a data fusion module for producing environment related information,
a trajectory predictor module for predicting a future trajectory of the vehicle,
an estimator module for estimating a desired lateral lane position of the vehicle and/or a guiding force, and
a decision system module for detecting whether a force is exerted on the steering device by a driver and, if the force is exerted on the steering device by the driver, deciding if a guiding force should be provided and, if to be provided, for defining an amount of such guiding force depending on a hierarchically ordered set describing a predetermined driving behavior of the vehicle, and adapting the amount of guiding force depending on the direction in which the vehicle is intended to move, and activating one or more actuators for supplying the adapted amount of guiding force to the steering device, with one or more inputs for sensor data for the data fusion module, an input for vehicle related data and one or more outputs for an output of guiding force demand and/or warning signal.

31. The system of claim 30, comprising an electric motor for providing a guiding force to a steering device.

32. A non-transitory computer readable medium comprising a software code adapted to perform a method or for use in a method for supporting lane keeping of a vehicle equipped with as steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
detecting whether a force is exerted on the steering device by a driver;
if the force is exerted on the steering device by the driver, providing a guiding force to the steering device; and
when guiding force is provided,
  a) defining an amount of the guiding force depending on a hierarchically ordered set describing a predetermined driving behavior of the vehicle,
  b) adapting the amount of guiding force depending on the direction in which the vehicle is intended to move, and
c) activating one or more actuators for supplying the adapted amount of guiding force to the steering device.

33. A computer programmed with software code for use in a method for supporting keeping of a vehicle equipped with a steering device, comprising
providing vehicle related information;
providing environment related information;
combining vehicle and environment related information;
predicting a future trajectory of the vehicle based on vehicle and environment related information;
estimating a desired lateral lane position of the vehicle and/or a guiding force;
comparing the future trajectory and-the-desired lateral lane position;
detecting whether a force is exerted on the steering device by a driver;
if the force is exerted on the steering device by the driver, providing a guiding force to the steering device; and
when guiding force is provide,
  a) defining an amount of the guiding force depending on a hierarchically ordered set describing a predetermined driving behavior of the vehicle,
  b) adapting the amount of guiding force depending on the direction in which the vehicle is intended to move, and
  c) activating one or more actuators for supplying the adapted amount of guiding force to the steering device.

34. A non-transitory computer readable medium comprising a computer program product, the computer readable program product comprising a program code for use in a method comprising at least the steps of
combining vehicle and environment related information;
predicting a future trajectory of the vehicle based on vehicle and environment related information;
estimating a desired lateral lane position and/or a guiding force;
comparing the future trajectory and the desired lateral lane position;
detecting whether a force is exerted on the steering device by a driver;
if the force is exerted on the steering device by the driver, providing a guiding force to the steering device; and
when guiding force is to be provided,
  a) defining an amount of the guiding force depending-on a hierarchically ordered set describing a predetermined driving behavior of the vehicle;
  b) adapting the amount of guiding force depending on the direction in which the vehicle is intended to move.

35. The computer readable medium according to claim 34, wherein the method further comprises the step of activating one or more actuators for supplying the adapted amount of guiding force to the steering device.

* * * * *